Patented Mar. 30, 1937

2,075,370

UNITED STATES PATENT OFFICE 2,075,370

PRODUCTION OF SODIUM ALUMINIUM FLUORIDE

Walter Strathmeyer, Oppau, Germany, assignor to I. G. Farbenindustrie Aktiengesellschaft, Frankfort-on-the-Main, Germany No Drawing. Application June 30, 1936, Serial No. 88,087. In Germany July 6, 1935

9 Claims. (Cl. 23—88)

This invention relates to the production of sodium aluminium fluoride of the type occurring in nature as the mineral cryolite.

Synthetic cryolite is industrially obtained by causing aluminium fluoride to react with hydrofluoric acid and a sodium salt. The aluminium fluoride necessary for the process must first be obtained by the reaction of alumina with hydrofluoric acid and thus the whole of the fluorine contained in the cryolite is introduced in the form of hydrofluoric acid during the course of the preparation of the cryolite. It is known that in the reaction of aluminium fluoride with a sodium salt and hydrofluoric acid, the latter may be used in the form of ammonium fluoride, but for the preparation of the aluminium fluoride pure free hydrofluoric acid is necessary in every case. According to another process sodium aluminium fluoride is produced by digesting together sodium fluoride and aluminium hydrate at temperatures above 75° C.; preferably at a temperature of approximately 175° C. In this case a large amount of sodium hydroxide is obtained as a by-product which must be neutralized by means of an acid. Without such a neutralization only part of the desired sodium aluminium fluoride is precipitated. But after completing the precipitation by neutralization of the sodium hydroxide formed there arises the new danger of obtaining an impure product containing sodium salts which can hardly be removed therefrom.

I have now found that cryolite or double salt compounds of similar composition can be obtained in a simple manner from ammonium fluoride without the use of pure free hydrofluoric acid, without the preparation of aluminium fluoride as an intermediate product and without the other drawback mentioned by causing ammonium fluoride to react with alumina in the presence of aqueous caustic soda solution. The preferable procedure is first to dissolve alumina in caustic soda, having regard to the stoichiometrical proportions present in cryolite, and then to introduce this solution into a solution of ammonium fluoride and intimately mixing them, e. g. by stirring, or to introduce both solutions in the suitable ratio at the same time into the reaction vessel. In order to produce pure cryolite, the ammonia set free is removed so that its introduction into the cryolite molecule is hindered, preferably to as great an extent as possible, the heat set free during the reaction preferably being utilized for this purpose. The formation of ammonium-cryolite or of sodium fluoride is thus avoided. The ammonia expelled may be used again for the formation of ammonium fluoride.

As initial material there may also be used the aluminate solutions worked up in the manufacture of alumina, the said solutions if necessary being adjusted to the proportions of sodium and aluminium present in cryolite by the addition of caustic soda solution.

In this process the components preferably are used in the stoichiometrical proportions; any excess of alumina leads to the formation of impure sodium aluminium fluoride, whereas excessive ammonium fluoride causes no trouble.

It is true that instead of the sodium salts, caustic soda solution, which is usually more expensive, is used according to this invention but this disadvantage is more than counteracted by the advantages that no pure free hydrofluoric acid is necessary and that a special preparation of aluminium fluoride is dispensed with. Thus instead of pure fluor spar, which is becoming increasingly rare and which has hitherto been used for the preparation of the pure hydrofluoric acid, the cheaper and more abundantly available siliceous fluor spar may be used; this yields by treatment with sulphuric acid an impure hydrogen fluoride from which, however, by collection in ammonia and filtering off the precipitate of silicic acid thus formed a pure solution of ammonium fluoride may be readily obtained which is directly suitable for use in the process according to this invention.

The following example will further illustrate the nature of this invention but the invention is not restricted to this example. The parts are by weight.

*Example*

78 parts of aluminium hydroxide having a content corresponding to 64 per cent of $Al_2O_3$ are dissolved in 415 parts of 29 per cent caustic soda solution. The resulting solution is introduced into a solution of 222 parts of ammonium fluoride in 300 parts of water while stirring. An evolution of heat occurs whereby the temperature of the mixture rises to about 50° to 55° C. and the ammonia for the most part escapes as a gas; the residual ammonia is removed from the reaction mixture by slight additional heating to about 80° to 90° C. The precipitate obtained, which has a jelly-like character, is filtered off and washed. After drying it yields a product containing 12.8 per cent of aluminium (pure cryolite contains 12.86 per cent of aluminium).

What I claim is:

1. A process for the production of sodium aluminium fluoride comprising causing ammonium fluoride to react with alumina in the presence of aqueous caustic soda solution.

2. A process for the production of sodium aluminium fluoride comprising introducing a solution of sodium aluminate containing 3 mols of sodium hydroxide per each mol of alumina into a solution of ammonium fluoride and intimately mixing both solutions.

3. A process for the production of sodium aluminium fluoride comprising introducing a solution of sodium aluminate containing 3 mols of sodium hydroxide per each mol of alumina and at the same time a solution of ammonium fluoride into a reaction vessel and intimately mixing both solutions.

4. A process for the production of sodium aluminium fluoride comprising causing ammonium fluoride to react with alumina in the presence of aqueous caustic soda solution while avoiding any excess of the alumina component over the proportion stoichiometrically necessary for the formation of sodium aluminium fluoride.

5. A process for the production of sodium aluminium fluoride comprising causing ammonium fluoride to react with alumina in the presence of aqueous caustic soda solution in the proportions stoichiometrically necessary for the formation of sodium aluminium fluoride.

6. A process for the production of sodium aluminium fluoride comprising introducing a solution of sodium aluminate containing 3 mols of sodium hydroxide per each mol of alumina into a solution of ammonium fluoride, intimately mixing both solutions and removing the ammonia formed.

7. A process for the production of sodium aluminium fluoride comprising introducing a solution of sodium aluminate containing 3 mols of sodium hydroxide per each mol of alumina and at the same time a solution of ammonium fluoride into a reaction vessel, intimately mixing both solutions and removing the ammonia formed.

8. A process for the production of sodium aluminium fluoride comprising causing ammonium fluoride to react with alumina in the presence of aqueous caustic soda solution in the proportions stoichiometrically necessary for the formation of sodium aluminium fluoride and removing the ammonia formed.

9. A process for the production of sodium aluminium fluoride consisting in dissolving 78 parts of aluminium hydroxide having a content corresponding to 64 per cent of $Al_2O_3$ in 415 parts of 29 per cent caustic soda solution and introducing this solution into a solution of 222 parts of ammonium fluoride in 300 parts of water while stirring, removing the ammonia formed by heating to about 80° to 90° C., filtering off the precipitate, washing and drying it.

WALTER STRATHMEYER.